US009142364B2

(12) United States Patent
Pal

(10) Patent No.: US 9,142,364 B2
(45) Date of Patent: Sep. 22, 2015

(54) CONTACTOR MOUNTING PANEL WITH IMPROVED THERMAL CHARACTERISTICS

(75) Inventor: Debabrata Pal, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 189 days.

(21) Appl. No.: 13/537,326

(22) Filed: Jun. 29, 2012

(65) Prior Publication Data

US 2014/0002995 A1 Jan. 2, 2014

(51) Int. Cl.
*H02B 1/24* (2006.01)
*H01H 1/62* (2006.01)

(52) U.S. Cl.
CPC .................................... *H01H 1/62* (2013.01)

(58) Field of Classification Search
USPC ...................... 361/676–678, 679.46–679.54, 361/688–722, 752–753, 760, 772, 796, 799, 361/831
See application file for complete search history.

(56) References Cited

U.S. PATENT DOCUMENTS 3,662,137 A 5/1972 Cleaveland
7,180,316 B1 * 2/2007 Ismail et al. ............ 324/756.03
7,837,496 B1 * 11/2010 Pal ............................... 439/485
2006/0154497 A1 * 7/2006 Amemiya et al. .............. 439/66
2006/0250150 A1 * 11/2006 Tunaboylu et al. ........... 324/754
2007/0275572 A1 * 11/2007 Williams et al. ................ 439/66
2010/0237889 A1 * 9/2010 Desta et al. ................... 324/757
2010/0290204 A1 * 11/2010 Pal ............................... 361/775
2013/0257569 A1 * 10/2013 Pal ............................... 335/202

FOREIGN PATENT DOCUMENTS

GB 949807 2/1964

OTHER PUBLICATIONS

Eurpoean Search Report for Appliction No. 13165617.5-1808; Date of Mailing Nov. 7, 2013.

* cited by examiner

*Primary Examiner* — Courtney Smith
(74) *Attorney, Agent, or Firm* — Cantor Colburn LLP

(57) ABSTRACT

An electrical contactor assembly is provided including an electrical contactor, an electrical bus bar, and a single panel formed of one more layers of an electrically insulating, thermally conductive material. A plurality of posts protrude through and directly contact the panel. Each of the posts is constructed from an electrically and thermally conductive material. Each post has a first end configured to electrically and thermally connect to the electrical contactor and a second end configured to electrically and thermally connect to the bus bar.

12 Claims, 4 Drawing Sheets

CONTACTOR MOUNTING PANEL WITH IMPROVED THERMAL CHARACTERISTICS

BACKGROUND OF THE INVENTION

This invention generally relates to the field of electrical contactors and, more particularly, to an electrical contactor mounting assembly which is capable of dissipating heat into a mounting panel.

Contactor assemblies are used in electrical applications, such as aircraft power distribution systems, where power and current flow control of a multi-phase power distribution system is required. A contactor assembly typically has a panel on which several electrical contactors are mounted. Known mounting assemblies used to mount electrical contactors to the panels are constructed of thermally and electrically resistive materials, such as plastics.

Each of the contactors is connected to an electrical bus bar, and allows current to flow through the contactor and the corresponding bus bar whenever the contactor is in a closed position. The electrical power and current flow through the contactors is controlled by mechanically actuating a contact plate within the contactor such that, when current flow is desired to pass through the contactor, the contact plate is pushed into electrical contact with two leads and forms an electrical path coupling the leads, thereby allowing current to flow through it. Due to the amount of current traveling from the leads to the connector, waste heat is generated at the contact points and should be removed in order to prevent heat buildup. Additional factors such as imperfections in the contact surfaces of other imperfections can add to the amount of waste heat generated.

To dissipate the waste heat, previous known contactor mounting assemblies use thermally conductive electrical connections to allow the heat from the contact to be transmitted to the bus bars connected to each of the contactor's leads. The bus bars then dissipate heat into the atmosphere using natural convection and radiation techniques.

BRIEF DESCRIPTION OF THE INVENTION

According to one embodiment of the invention, an electrical contactor assembly is provided including an electrical contactor, an electrical bus bar, and a single panel formed of one more layers of an electrically insulating, thermally conductive material. Pluralities of posts protrude through and directly contact the panel. Each of the posts is constructed from an electrically and thermally conductive material. Each post has a first end configured to electrically and thermally connect to the electrical contactor and a second end configured to electrically and thermally connect to the bus bar.

According to an alternate embodiment of the invention, an electrical panel box assembly is provided including a plurality of electrical contactors, a plurality of electrical bus bars and a single panel formed of one more layers of an electrically insulating, thermally conductive material. Pluralities of posts protrude through and directly contact the panel. Each of the posts is constructed from an electrically and thermally conductive material. Each post has a first end configured to electrically and thermally connect to the electrical contactor and a second end configured to electrically and thermally connect to the bus bar.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
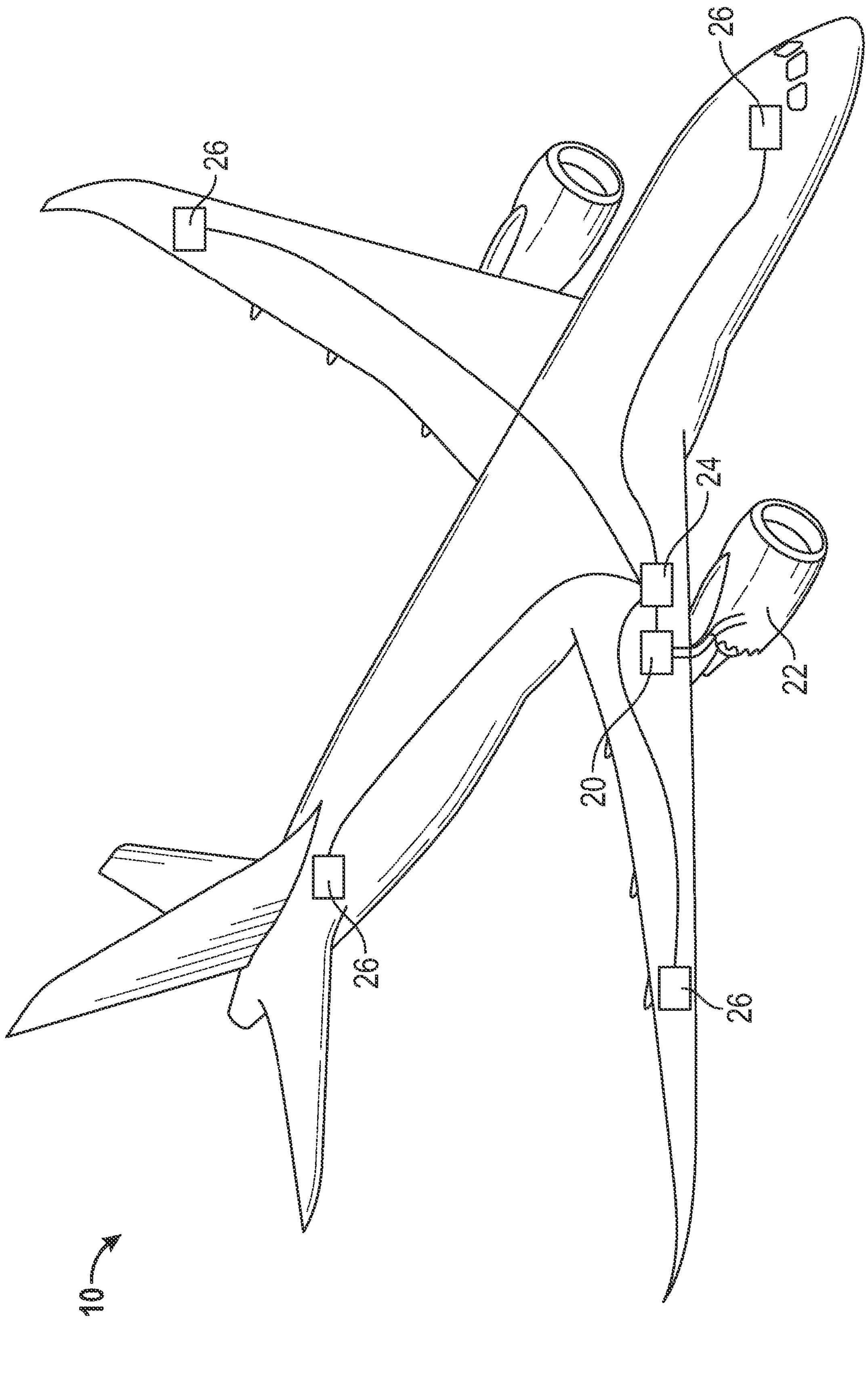
FIG. 1 is a schematic diagram of an aircraft.

Referring now to FIG. 1, an aircraft 10 including an electrical power distribution system is illustrated. The aircraft 10 includes a power generation system 20, which utilizes rotation within the jet engines 22 to generate either single phase or three phase electrical power. The power is sent to a panel box 24 that contains multiple electrical buses and contactor assemblies 100 (shown in FIG. 4) for controlling how the power is distributed throughout the aircraft 10. Through the use of the electrical contactor assemblies, power may be controlled for each onboard electrical system 26 independently.

Figure 2:
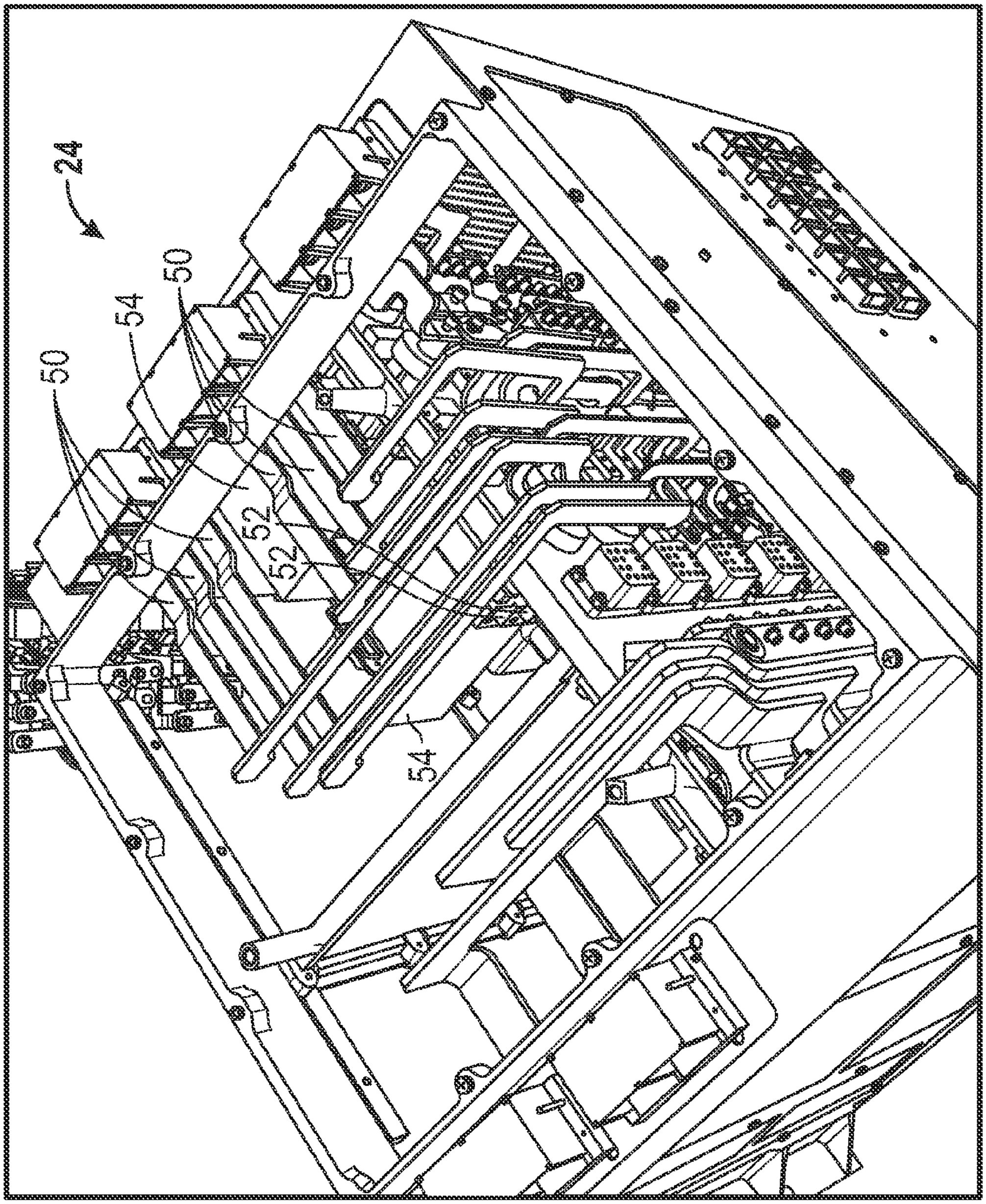
FIG. 2 is a schematic diagram of a portion of an exemplary power distribution network.

The interior of an exemplary panel box 24 is illustrated in FIG. 2. The interior of the panel box 24 has multiple electrical bus bars 50, which are interrupted by electrical contactor connections 52. When the contactor connections 52 are closed, electrical current and heat are allowed to flow between the connected bus bars 50 and a contactor 54. In known systems, all of the excess heat generated in the contactors 54 is transmitted to the bus bars 50 for dissipation by natural convection and radiation into the ambient atmosphere.

Figure 3:
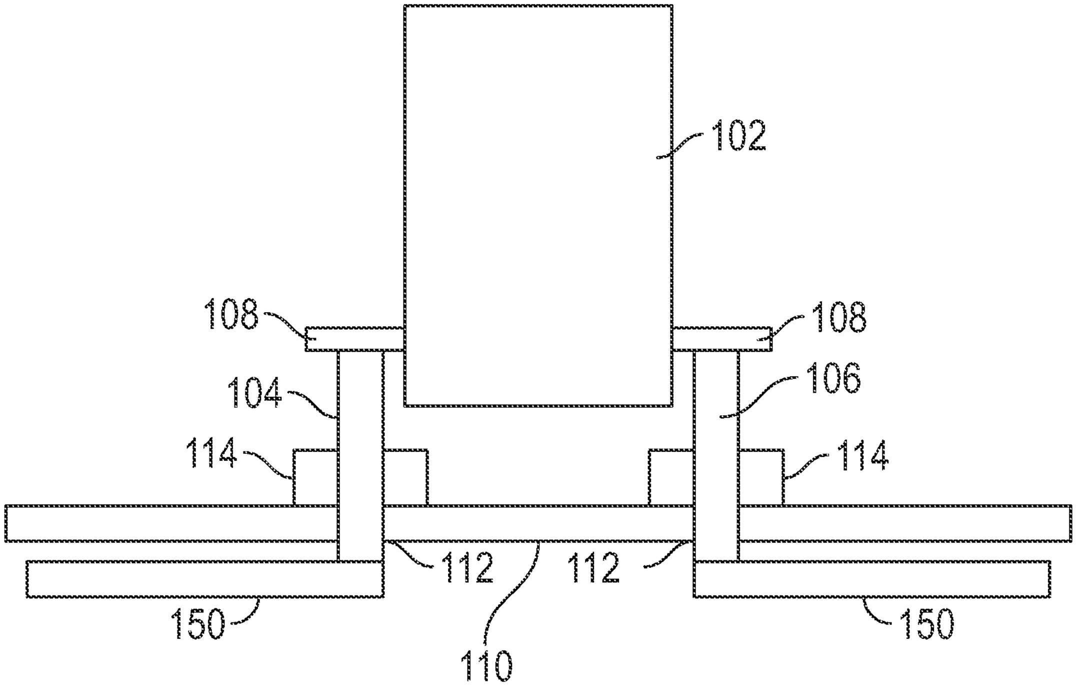
FIG. 3 is a cross-section of a contactor assembly in a power distribution network according to an embodiment of the invention.
Figure 4:
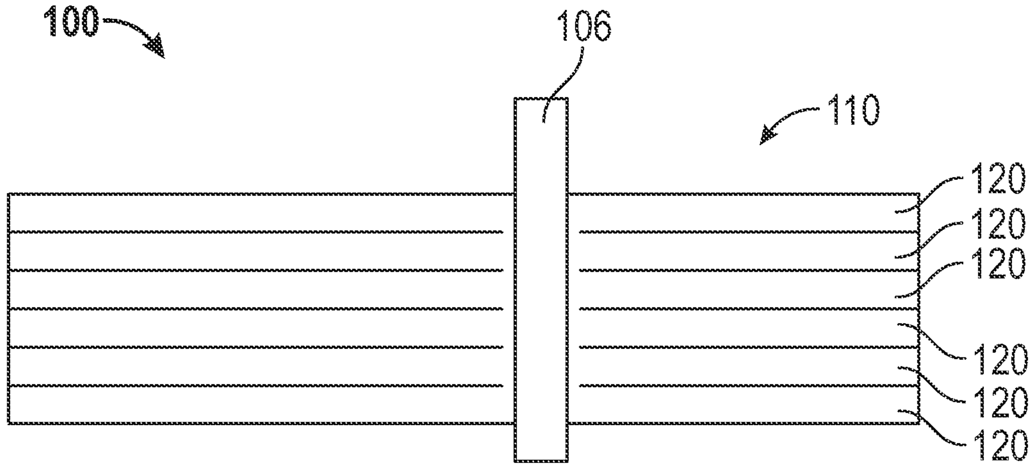
FIG. 4 is a cross-section of a portion of a contactor assembly in a power distribution network according to an embodiment of the invention.

Referring now to FIGS. 3 and 4, a contactor assembly 100 that includes an electrical contactor 102 coupled to at least one bus bar 150 is illustrated. The contactor assembly 100 includes one or more posts 104 for connecting a contactor 102 to a first side of a bus bar 150 and one or more posts 106 for connecting the contactor 102 to a second side of a bus bar 150. The electrical contactor 102 connects to the posts 104, 106 of the connector assembly 100 via a set of electrical leads 108 using known thermal and electrical connection techniques. The posts 104, 106 are electrically and thermally coupled to the bus bars 150. The contactor assembly 100 additionally includes a panel 110 including multiple holes 112 through which the posts 104, 106 extend. In one embodiment, the posts 104, 106 are in direct contact with the panel 110. A structural support 114, formed integrally with each of the posts 104, 106, is positioned at the interface between the posts 104, 106 and the panel 110 to mechanically fasten each post 104, 106 to the panel 110. In one embodiment, fasteners, such as screws for example, connect the structural support 114 to the panel 110.

In one embodiment, the panel 110 is electrically resistive and thermally conductive. In such an embodiment, the panel 110 may be constructed of a thermally conductive polymer such as CoolPoly®, for example. In another embodiment, illustrated in FIG. 4, the panel 110 may be a printed wire board having a plurality of layers 120 carrying a conductive material embedded thereon. The number of layers 120 and the material of the layers 120 included in the panel 110 will vary with each application based on the amount of heat to be dissipated. As illustrated, the panel 110 includes six layers, some or all of which may carry a conductive material. The conductive material may be formed, for example, of copper.

In known systems, insulation rings have been used to connect the posts 104, 106 to the panel 110 or structural support 114. The electrical resistivity of an insulation ring prevents electrical current from bleeding into the panel 110. In one embodiment of the present invention, because the panel 110 is electrically resistive, insulation rings are not needed in the contactor assembly 100. As such, and dissimilar from known systems, the posts 104, 106 directly contact the panel 110 for heat transfer.

Figure 5:
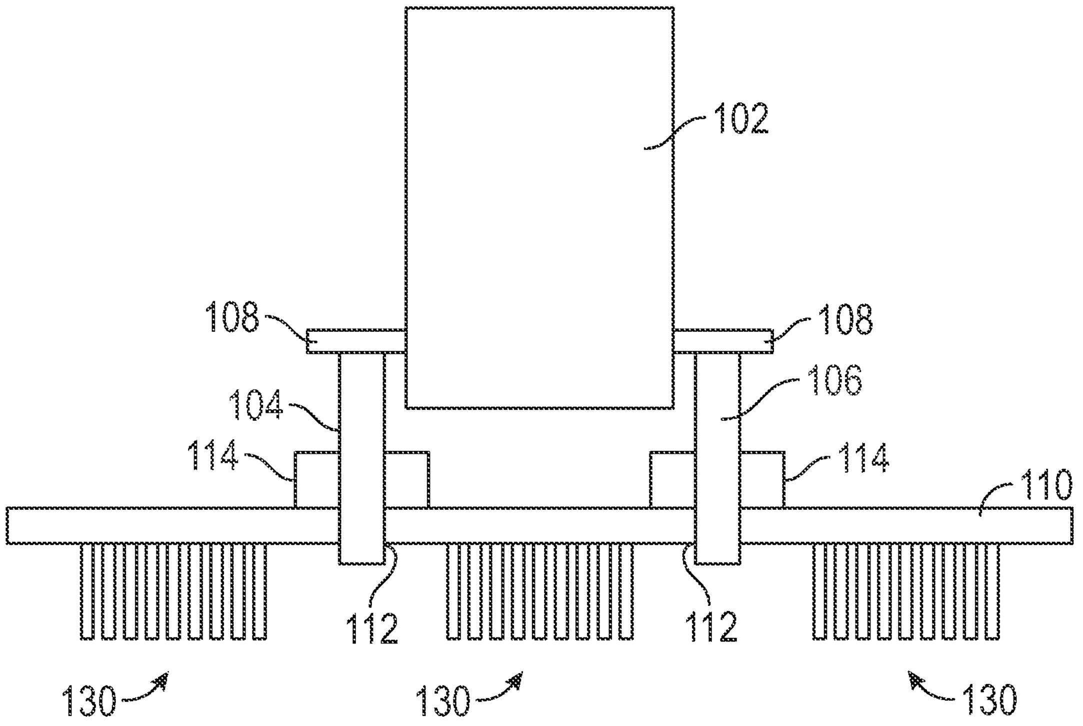
FIG. 5 is a cross-section of a contactor assembly in a power distribution network according to an embodiment of the invention.

The thermal conductivity of the posts 104, 106 allow heat to transfer from the contactor 102 to the panel 110. Once in the panel 110, the heat conducts through the panel 110 and dissipates into the surrounding air using radiation and convection in the same manner as the heat being dissipated by the bus bars 150 in known systems. The panel 110 has a significantly larger surface area exposed to the ambient atmosphere than the bus bars 150, such that more heat is dissipated into the atmosphere, resulting in a higher heat generation tolerance for the contactor 102. As illustrated in FIG. 5, the contactor assembly 100 may additionally include a plurality of cooling fins 130 mounted to a surface of the panel 110. In one embodiment, the cooling fins 130 are also made from a thermally conductive and electrically resistive material. The cooling fins 130 may be located on any portion of the panel depending on the design and space constraints. The cooling fins 130 may be a separate component thermally coupled to the panel 110 or alternatively may be formed integrally with the panel 110. The cooling fins provide additional surface area from which heat may be dissipated, thereby increasing the cooling efficiency of the panel 110.

By having only a single panel 110 for heat dissipation, the contactor assembly 100 is simplified relative to known assemblies. In addition, because the contactor assembly 100 more efficiently dissipates heat, the bus bars 150 may be reduced to the size required to transfer electrical current to a load and need not be sized to also dissipate heat. By improving the heat dissipation of the contactor assembly 100, the size and weight, and therefore the cost of the contactor assembly 100 are all reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical contactor assembly comprising:
- an electrical contactor;
- an electrical bus bar;
- a single panel including a plurality of integrally formed layers of an electrically insulating, thermally conductive material, each of the plurality of layers having an identical cross-section;
- a plurality of posts protruding through and directly contacting the panel, each of the posts being constructed from an electrically and thermally conductive material, wherein a first end of each of the posts directly contacts the electrical contactor such that the posts electrically and thermally connect the electrical contactor to the electrical bus bar.

2. The electrical contactor assembly according to claim 1, wherein the panel is a printed wire board having a plurality of conductive elements embedded in the plurality of integrally formed layers.

3. The electrical contactor assembly according to claim 1, further comprising a structural support configured to mechanically fasten each of the plurality of posts to the panel.

4. The electrical contactor assembly according to claim 1, further comprising at least one cooling fin mounted to a portion of the panel.

5. The electrical contactor assembly according to claim 4, wherein the at least one cooling fin is made from a thermally conductive electrically insulating material.

6. The electrical contactor assembly according to claim 1, wherein the electrical contactor assembly does not include an electrically resistive insulation ring.

7. An electrical panel box assembly comprising:
- a plurality of electrical contactors;
- a plurality of electrical bus bars;
- a single panel including a plurality of integrally formed layers of an electrically insulating, thermally conductive material, each of the plurality of layers having an identical cross-section; and
- a plurality of posts protruding through and directly contacting the panel, each of the posts being constructed from an electrically and thermally conductive material, wherein a first end of each of the posts directly contacts one of the plurality of electrical contactors such that the posts electrically and thermally connect the electrical contactor to at least one electrical bus bar.

8. The electrical panel box assembly according to claim 7, wherein the panel is a printed wire board, and at least one of the plurality of integrally formed layers includes a conductive material embedded therein.

9. The electrical panel box assembly according to claim 7, further comprising a plurality of structural supports configured to mechanically fasten each of the plurality of posts to the panel.

10. The electrical panel box assembly according to claim 7, further comprising at least one cooling fin mounted to a portion of the panel.

11. The electrical panel box assembly according to claim 10, wherein the at least one cooling fin is made from a thermally conductive electrically resistive material.

12. The electrical panel box assembly according to claim 7, wherein the electrical contactor assembly does not include an electrically resistive insulation ring.

* * * * *